(12) United States Patent
Putnam et al.

(10) Patent No.: US 7,634,149 B2
(45) Date of Patent: Dec. 15, 2009

(54) METHOD FOR DYNAMICALLY UPDATING A PLANAR TOPOLOGY

(75) Inventors: Christopher Eric Putnam, Henniker, NH (US); Mark W. Anderson, Manchester, NH (US)

(73) Assignee: Autodesk, Inc., San Rafael, CA (US)

( * ) Notice: Subject to any disclaimer, the term of this patent is extended or adjusted under 35 U.S.C. 154(b) by 779 days.

(21) Appl. No.: 10/954,526

(22) Filed: Sep. 29, 2004

(65) Prior Publication Data

US 2005/0110800 A1    May 26, 2005

Related U.S. Application Data

(60) Provisional application No. 60/507,062, filed on Sep. 29, 2003, provisional application No. 60/507,080, filed on Sep. 29, 2003, provisional application No. 60/506,975, filed on Sep. 29, 2003, provisional application No. 60/506,974, filed on Sep. 29, 2003.

(51) Int. Cl.
*G06K 9/42* (2006.01)
*G06K 9/44* (2006.01)
*G06K 9/00* (2006.01)
*G06T 15/30* (2006.01)
*G06T 17/20* (2006.01)
*G09G 5/00* (2006.01)

(52) U.S. Cl. ............... 382/256; 382/113; 345/423; 345/619

(58) Field of Classification Search ........ 382/256; 345/619
See application file for complete search history.

(56) References Cited

U.S. PATENT DOCUMENTS

| 5,329,464 | A | | 7/1994 | Sumic et al. |
| 5,371,845 | A | * | 12/1994 | Newell et al. ............... 715/808 |
| 5,467,444 | A | * | 11/1995 | Kawamura et al. .......... 345/441 |
| 5,553,211 | A | * | 9/1996 | Uotani ...................... 345/641 |
| 5,555,354 | A | | 9/1996 | Strasnick et al. |
| 5,745,751 | A | * | 4/1998 | Nelson et al. ............ 707/104.1 |
| 6,496,814 | B1 | * | 12/2002 | Busche ........................ 706/21 |
| 6,732,120 | B1 | | 5/2004 | Du |
| 6,907,364 | B2 | | 6/2005 | Poolla et al. |
| 6,912,692 | B1 | | 6/2005 | Pappas |
| 6,965,945 | B2 | | 11/2005 | Lin et al. |
| 7,054,741 | B2 | | 5/2006 | Harrison et al. |
| 7,130,774 | B2 | * | 10/2006 | Thomas et al. ................. 703/1 |
| 7,164,883 | B2 | | 1/2007 | Rappaport et al. |
| 7,511,697 | B2 | * | 3/2009 | Peterson ..................... 345/156 |
| 2001/0049704 | A1 | | 12/2001 | Hamburg et al. |
| 2003/0158668 | A1 | | 8/2003 | Anderson |

(Continued)

OTHER PUBLICATIONS

Kurlander et al., "Interactive Constraint-Based Search and Replace," Proc. 1992 Conf. on Human Factors in Computer Systems, ACM, New York, NY, pp. 609-618.*

(Continued)

*Primary Examiner*—Brian P Werner
*Assistant Examiner*—Jose M Torres
(74) *Attorney, Agent, or Firm*—Gates & Cooper LLP

(57) ABSTRACT

A CAD/GIS system that dynamically updates planar topologies through incremental updating techniques. Rather than batch processing all of the changes to every geometrical feature in a given site map, the changes are made in incremental fashion and only enclosures or faces/parcels that are affected by changes are updated.

18 Claims, 6 Drawing Sheets

U.S. PATENT DOCUMENTS

| | | | |
|---|---|---|---|
| 2004/0004611 | A1 | 1/2004 | Komomicki et al. |
| 2004/0076279 | A1 | 4/2004 | Taschereau |
| 2005/0034075 | A1 | 2/2005 | Riegelman et al. |
| 2005/0068315 | A1 | 3/2005 | Lewis et al. |

OTHER PUBLICATIONS

Gold, "Applications of dynamic voronoi data structures. In Oral Presentation," Second European Conference on Geographic Information Systems, Brussels, Belgium 1991, http://www.voronoi.com/pdfs/1990-1994/application_of_dynamic_voronoi_data_structures.pdf. Printed May 28, 2007.

Schneider et al., "GPU-friendly high-quality terrain rendering," Journal of the WSCG, vol. 14, 2006, http://wwwcg.in.tum.de/Research/data/Publications/wscg06.pdf.

Fowler et al., "Automatic extraction of irregular network digital terrain models," In Proc. ACM SIGGraph '79, pp. 199-207, 1979.

Lindstrom et al, "Visualization of large terrains made easy," In Proc. IEEE Visualization '01, pp. 363-370, 2001.

Lindstrom et al., "Terrain simplification simplified: A general framework for view-dependent out-of-core visualization," IEEE Transactions on Visualization and Computer Graphics, 8(3):239-254, 2002.

Koller et al., "Virtual GIS: A real-time 3D geographic information system," In Proc. IEEE Visualization 95, pp. 94-100, 1995.

Suter et al., "Automated generation of visual simulation databases using remote sensing and GIS," In IEEE Visualization '95, pp. 86-93, 1995.

The Voronoi Web Site 1990-1995. http://www.voronoi.com/pubs_1990.htm. Printed on May 28, 2007.

Giordan et al. "Using Adobe Photoshop 5", Jul. 1998, published by Que, copyright 1998, pp. 128, 130-131, 346-351, 361.

Blatner et al. "Essential Photoshop 6 Tips", Aug. 13, 2001, via AdobePress www.adobepress.com/articles/printerfriendly.asp?p=22789, article courtesy of PeachPit Press.

\* cited by examiner

METHOD FOR DYNAMICALLY UPDATING A PLANAR TOPOLOGY

CROSS-REFERENCE TO RELATED APPLICATIONS

This application claims the benefit under 35 U.S.C. Section 119(e) of the following co-pending and commonly-assigned U.S. provisional patent applications, all of which are incorporated by reference herein:

Provisional Application Ser. No. 60/507,062, filed Sep. 29, 2003, by Christopher E. Putnam and Mark W. Anderson, entitled "PARCEL DESIGN AND PLANAR TOPOLOGY,";

Provisional Application Ser. No. 60/507,080, filed Sep. 29, 2003, by Sreenadha B. Godavarthy, John M. Lewis, Thomas M. Inzing a, Edward J. Connor, Robert B. Todd, Jr., and Christopher E. Putnam, entitled "SURFACE PROCESSING,";

Provisional Application Ser. No. 60/506,975, filed Sep. 29, 2003, by Kumud Dev Vaidya, Michael C. Rogerson, and Bhamadipati S. Rao, entitled "HORIZONTAL ALIGNMENT PROCESSING,"; and Provisional Application Ser. No. 60/506,974, filed Sep. 29, 2003, by Kumud Dev Vaidya, Michael C. Rogerson, and Bhamadipati S. Rao, entitled "VERTICAL ALIGNMENT PROCESSING,".

This application is related to the following co-pending and commonly-assigned patent applications, all of which are incorporated by reference herein:

Utility application Ser. No. 10/953,806, filed on Sep. 29, 2004, by Sreenadha B. Godavarthy and John M. Lewis, entitled "SURFACE SMOOTHING TECHNIQUES,";

Utility application Ser. No. 10/953,807, filed on Sep. 29, 2004, by Kumud Dev Vaidya, Michael C. Rogerson, and Bhamadipati S. Rao, entitled "INTERACTIVE CONSTRAINT-BASED ALIGNMENT OBJECTS,";

Utility application Ser. No. 10/954,542, filed on Sep. 29, 2004, by Christopher E. Putnam and Mark W. Anderson, entitled "METHOD AND APPARATUS FOR AUTOMATICALLY DISCOVERING HIERARCHICAL RELATIONSHIPS IN PLANAR TOPOLOGIES,";

Utility application Ser. No. 10/954,529, filed on Sep. 29, 2004, by Christopher E. Putnam and Mark W. Anderson, entitled "INTERACTIVE METHOD FOR DESIGNING PARCELS,";

Utility application Ser. No. 10/953,93 filed on Sep. 29, 2004, by John M. Lewis, Thomas M Inzing a and Edward J. Connor, entitled "INTERACTIVE TRIANGULATED IRREGULAR NETWORK (TIN) SURFACES DESIGN,"; and Utility application Ser. No. 10/953,245, filed on Sep. 29, 2004, by John M. Lewis, Robert B. Todd, Jr., Edward J. Connor, and Christopher E. Putnam, entitled "SURFACE CONSTRUCTION AUDIT TRAIL AND MANIPULATION,".

BACKGROUND OF THE INVENTION

1. Field of the Invention

The present invention relates generally to computer aided design (CAD) applications and geographic information systems (GIS), and in particular, to a method, apparatus, and article of manufacture for dynamically updating planar topologies.

2. Description of the Related Art

Computer aided design (CAD) applications are traditionally used for creating and editing drawings (e.g., maps, floor plans, and engineering designs). Further, CAD applications enable users to create/modify highly precise and accurate drawings/maps. Civil engineers and surveyors, for whom precision and accuracy are of primary importance, have adopted CAD applications to speed data input and perform computations for design projects.

Geographic information systems (GIS) have been traditionally used for spatial analysis and mapping and allow users to store, retrieve, manipulate, analyze, and display geographically referenced data. However, traditional GIS have been aimed at general cartography and broad land-use analysis, and not precision design for the construction and management of real-world projects. In this regard, the geometric precision that many engineers require has not been provided by traditional GIS systems.

Some GIS companies have attempted to use complex databases to model real-world objects. However, such databases are still built on points, lines, and polygons and cannot store geometric objects in a traditional CAD application (e.g., true arcs or road spirals). As such, use of CAD systems in a GIS environment has been limited, because the results have been less than favorable.

Many organizations have used both CAD and GIS tools in different departments to utilize the different specific features available. Further, data from original CAD drawings may be frequently imported or digitized for use in the GIS mapping environment. However, because of the limitations of GIS systems and/or CAD systems, during such a transition, data connectivity, accuracy, and geometric precision are often lost. Accordingly, what is needed is an integrated solution that provides the functionality and tools of a GIS system with the precision and accuracy of a CAD application.

In an attempt to address the above concerns, industry specific components were built on top of the CAD engine to address specialized needs and eventually, an integrated solution was developed (e.g., Autodesk Map™ software available from the assignee of the present invention). Integrated solutions attempt to provide GIS functionality (e.g., multiuser editing, polygon overlay and analysis, topology, thematic mapping, etc.) within a CAD application and spatial database. The integrated solution allows civil engineers the ability to integrate the precision engineering tasks (from CAD) (e.g., site, roadway, and hydrological design) with the spatial analysis tools and data management of GIS. Such systems are known as CAD/GIS systems. Nonetheless, the integrated solutions may have various limitations. As such, there is a need in the art that allows for the use of precision engineering CAD programs and systems in a GIS environment.

SUMMARY OF THE INVENTION

To minimize the limitations in the prior art, and to minimize other limitations that will become apparent upon reading and understanding the present specification, the present invention discloses a method and apparatus for dynamically updating planar topologies through incremental updating techniques in a CAD/GIS system. Rather than batch processing all of the changes to every geometrical feature in a given site map, the changes are made in incremental fashion and only enclosures or parcels that are affected by changes are updated.

Embodiments of the invention provide methods, apparatuses, and articles of manufacture for dynamically updating a planar topology in a computer assisted design and geographic information (CAD/GIS) system. A method in accordance with the present invention comprises defining a plurality of boundaries within the CAD/GIS system, defining at least a first face within the CAD/GIS system, where the first face is defined using at least one of the defined boundaries, determining, using the CAD/GIS system, that the first face is a closed polygon, and dynamically updating the planar topology within the CAD/GIS system by incrementally processing only the boundaries that are associated with the first face.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a CAD/GIS system that automatically discovers hierarchical relationships between faces in a planar topology. The present invention can be used to subdivide parcels of land into residential and commercial lots or parcels, as well as right-of-ways and public areas. As the geographical and positional data for the site map for the entire site is entered into the CAD/GIS system, the parcels of land, lots, and other area definitions are automatically placed into a hierarchical relationship, which stores the data and definitions in a manner that minimizes rework of the definitions.

Hardware Environment

Figure 1:
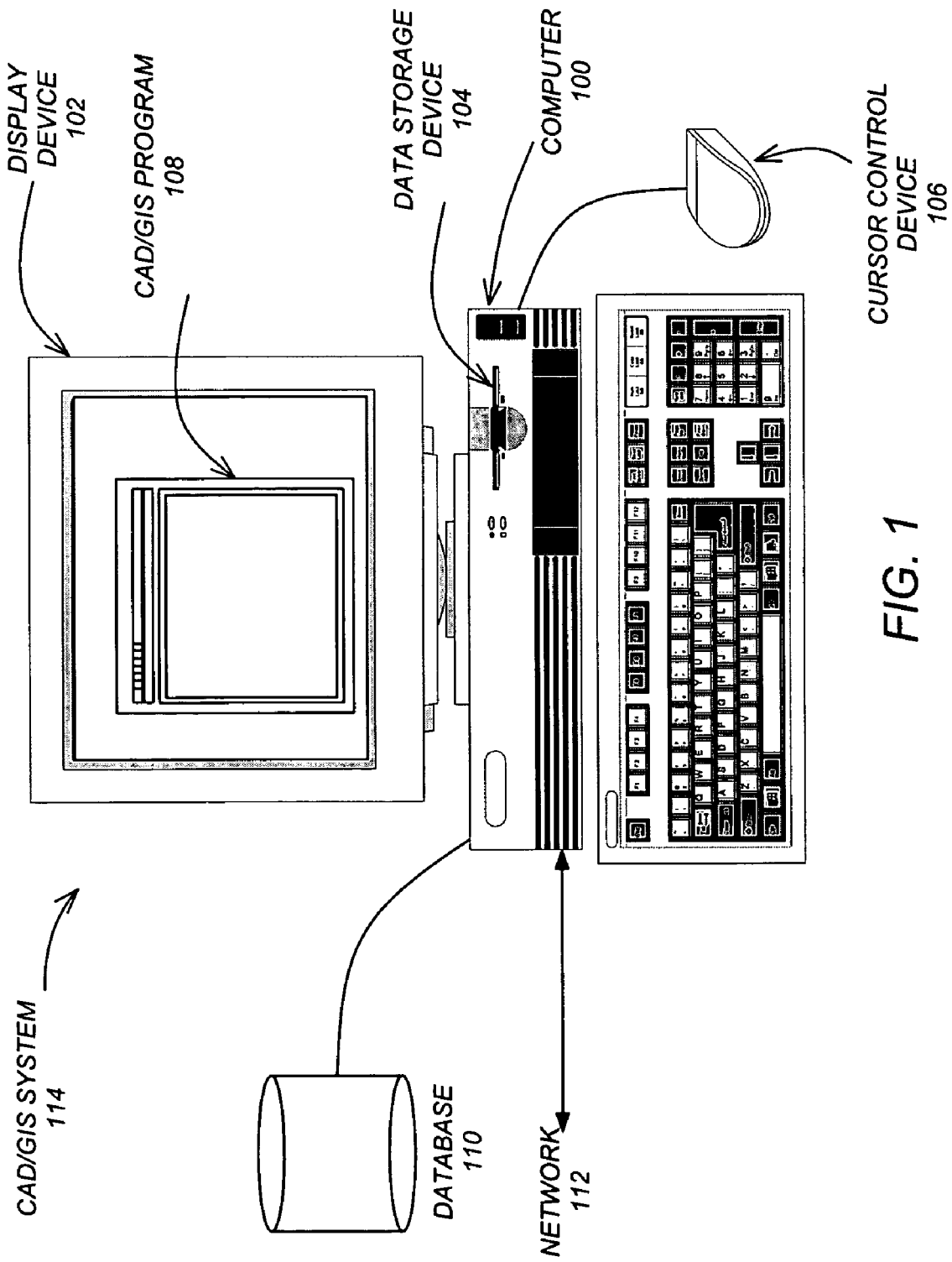
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented Computer Aided Design/Geographical Information System (CAD/GIS) program 108, wherein the CAD/GIS program 108 is represented by a window displayed on the display device 102. Preferably, the CAD/GIS program 108 comprises the AUTODESK LAND SOLUTIONS suite of products, which includes the AUTODESK LAND DESKTOP 2005 and AUTODESK CIVIL DESIGN 2005. More information on these products can be found in the manuals entitled, "Autodesk Land Desktop/Getting Started," March 2004 and "Autodesk Civil Design/Getting Started," March 2004, both of which are incorporated by reference herein.

Generally, the CAD/GIS program 108 comprises logic and/or data embodied in or readable from a device, e.g., one or more fixed and/or removable data storage devices 104 connected directly or indirectly to the computer 100, one or more remote devices coupled to the computer 100 via a data communications device, etc. Further, the CAD/GIS program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary environment illustrated in FIG. 1 is not intended to limit the present invention. Indeed, those skilled in the art will recognize that other alternative environments may be used without departing from the scope of the present invention. Accordingly, FIG. 1 illustrates an integrated CAD/GIS system 114 that combines the traditional capabilities of CAD and GIS tools with common spatial management features. In this regard, such an integrated solution enables the use of true geometry, precision, powerful creation and editing tools, and drawing and document production of a CAD system in addition to the GIS capabilities for polygons, topology, overlay analysis, seamless database use, and thematic mapping.

Discovering and Generating Hierarchical Relationships

The present invention allows for selective coupling of two or more planar topologies which allows for suitable update and query by the CAD/GIS program 108. The planar topologies, often referred to as "layers" or "levels" in a CAD system, allow for systematic updating of the features in the CAD/GIS program 108, which simplifies the management of such a system.

Figure 2:
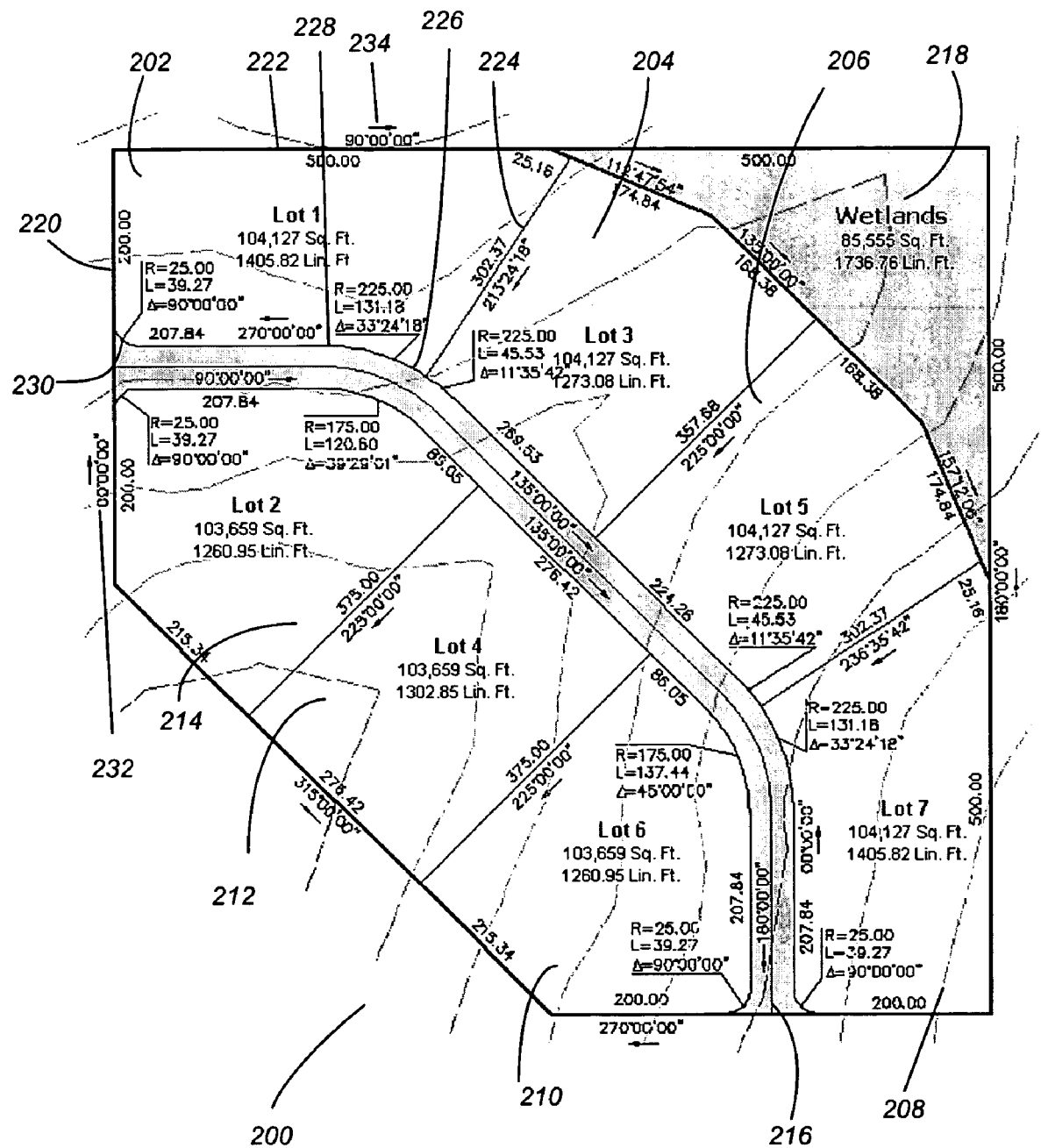
FIG. 2 illustrates a first graphical display of an embodiment of the present invention.

FIG. 2 illustrates a first graphical display of an embodiment of the present invention.

FIG. 2 shows site map 200, with parcels 202, 204, 206, 208, 210, 212, and 214. As described herein, faces define any enclosed area. Further, parcels define faces that may be defined/described via a legal definition such as a definition described in accordance with the statutes, regulations, and ordinances of the State of California. Accordingly, faces may include parcels or any enclosed area that may be defined legally or otherwise. Thus, right-of-way 216 and wetlands 218 shown in FIG. 2 are also faces. Each face identified as a lot in FIG. 2 may be described using a legal definition and accordingly each such face may be a parcel.

Each parcel 202-214 contains displayed information such as frontage lines, square footage, linear footage, radii of curves, etc. Each parcel 202-214 is defined by boundaries such as lines, radii, curves, etc. that are joined to form a closed area. Each parcel 202-214 is defined by boundaries that are joined to form a closed area. For example, and not by way of limitation, parcel 202 is defined by line 220, line 222, line 224, radius 226, line 228, and radius 230. Line 220 is defined as a straight line, two hundred feet long, in a northern direction (designated as 0 degrees, 0 minutes, and 0 seconds by designation 232). Line 222 is defined as a straight line, five hundred feet long, in an easterly direction (designated as 90 degrees, 0 minutes, and 0 seconds by designation 234). Lines 220, 222, 224, radius 226, line 228, and radius 230 form a closed area, which defines parcel 202. Line 224 is shared with parcel 204, and helps define parcel 204 as well as parcel 202.

Similarly, radius 226, line 228, and radius 230 abut right-of-way 216, and help to define right-of-way 216 as well as parcel 202.

The structure of the present invention allows for determination of areas and linear footage based on the boundaries such as lines and radii which are used to form parcels 202-214. For example, and not by way of limitation, parcel 202 has an area of 104,127 square feet, which is determined by the CAD/GIS program 108 using the area defined by the boundaries including lines 220-224, radius 226, line 228, and radius 230.

The structure of the present invention allows the CAD/GIS program 108 to dynamically detect enclosed areas, and incrementally process the geometry of the parcels 202-214 such that only changes in the geometry are updated, rather than batch processing every geometrical shape in the site map 200.

As parcel 202 is being drawn, the CAD/GIS program 108 of the present invention keeps track of the geometrical shape being created, e.g., as lines 220, 222, 224, 228 and radii 226 and 230 are being drawn and/or connected together, the CAD/GIS program 108 computes the area and enclosure of those items and groups them together using pointers or other programming techniques on a dynamic basis, rather than waiting for a save command or batch processing command.

Further, as faces/parcels are changed, the present invention monitors and updates only the geometry that has changed, rather than processing items that have not changed since the last update. As such, the present invention saves time and computer processing capabilities for other items that may need such resources, as well as providing immediate feedback to the user.

Figure 3:
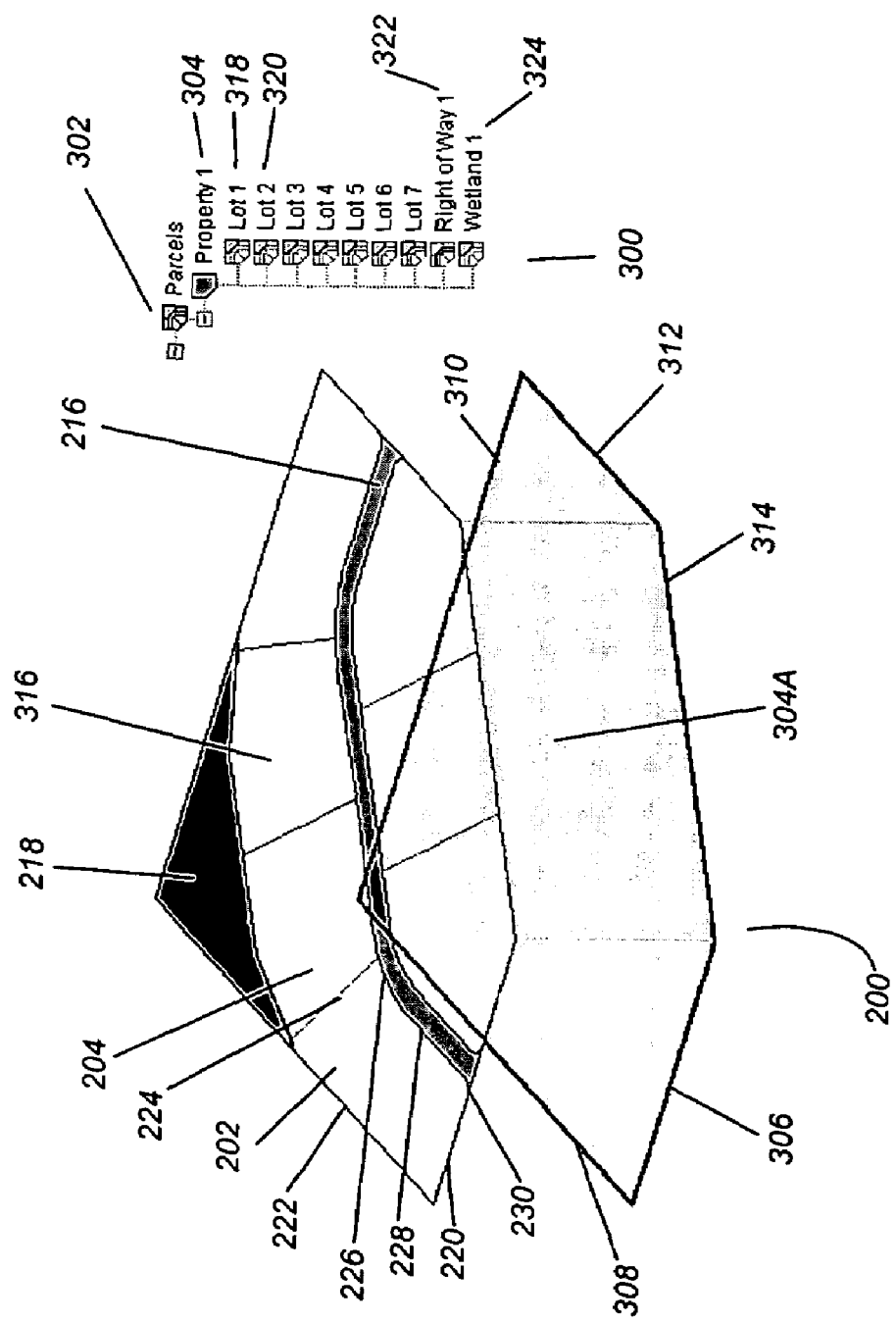
FIG. 3 illustrates an embodiment of the present invention showing an expanded view of the parcels, right-of-way, and other features of the present invention.

FIG. 3 illustrates an embodiment of the present invention showing an expanded view of the parcels, right-of-way, and other features of the present invention.

Site map 200 is now shown in a layered or expanded view, with hierarchy 300 illustrated. Each site is divided up into separate root faces, with a specific property being given a name. As an example, and not by way of limitation, root face 304A is given a name "Property 1" in the hierarchy 300. Each root face 304 can then be further subdivided into lots, streets, parks, or other areas of land as described further herein.

Root face 304A is defined in the CAD/GIS program 108 using boundaries, similar to the boundaries used to define parcel 202 described with respect to FIG. 2. In this instance, root face 304A is defined using lines 306-314, which form a closed polygon that defines the boundaries and area of root face 304A. The spatial coordinates that define this polygon are stored in the hierarchy 300 in the "Property 1" folder 304. Other properties that are part of site 302 can be defined and stored in other property folders 304 as needed to define the entire site 302. Further, additional sites 302 can be added as needed to define other areas of land being subdivided. The lines 306-314 may be used to act as a boundary of other root faces 304 depending on the geographic location of the other root faces 304.

Shown as a separate layer in the hierarchy is the lot layer 316. This layer is a subordinate layer to property layer 304, and comprises the definitions of lots, right-of-ways, parks, and other sectional areas of root face 304. Each of the lots, right-of-ways, parks, and other sectional areas are completely contained within root face/parcel 304, and, as such, appear as lower levels in the hierarchy 300. For example, and not by way of limitation, parcel 202 is shown as "Lot 1" folder 318, parcel 204 is shown as "Lot 2" folder 320, right-of-way 216 is shown as "Right-of-way 1" folder 322, and wetlands 218 is shown as "Wetland 1" folder 324 in the hierarchy 300. In order to maintain this hierarchy 300, the boundaries associated with each face/parcel, for example, parcel 202, must lie completely within the area defined by the boundaries of root face/parcel 304A. In this case, the lines 306-314 define root face 304A. Each boundary (e.g., line or radius) associated with parcel 202, i.e., lines 220, 222, 224, radius 226, line 228, and radius 230, lie completely within, or are coextensive with, lines 306-314. Thus, the definitions for parcel 202, which would be placed in a folder 318 by the CAD/GIS program 108, would automatically be placed by the present invention as a subordinate or child folder 318 underneath "Property 1" folder 304. Similarly, as parcel 204 is defined, the present invention would note that the entire defined area of parcel 204 is within the area defined by parcel 304A, and the system would place the definition of parcel 204 as a subordinate or child folder 320 underneath "Property 1" folder 304.

The system of the present invention determines the hierarchical relationship between faces by first dividing the faces into the smallest possible pieces, according to the provided linework After subdividing the face in this way, faces of any level may be reconstructed by walking the edges of the topology and using the information stored in the edges to determine which way to turn. For instance, consider the point at which the line that separates wetlands 218 from parcel 202 meets the outside boundary line 222. When navigating through this point, it is possible to either stay straight and follow the outside boundary of face 304A, or turn along the shorter line and follow the boundary of parcel 202. The level of navigation determines which path is taken. Properties stored on the linework segments allow the present invention to determine which route to take. These properties include, but are not limited to a level number and line type classification.

The system of the present invention, if implemented in an object oriented programming environment, can use pointers or other methods to determine whether parcel 204 is completely within root face 304A. Other methods can be used, such as determination of area within another area, determination of points wholly within the boundaries of other points, or other methods, depending on the programming environment or the program logic used within any given programming environment to implement the system of the present invention.

The present invention dynamically updates the data structure as the enclosed areas, e.g., parcel 202, are created in the CAD/GIS system 114. As such, the present invention increases the speed of CAD/GIS system 114, which makes CAD/GIS system 114 and CAD/GIS program 108 more desirable for users. For example, and not by way of limitation, as parcel 202 is completed, e.g., the final boundary line 220 is drawn to enclose the area, CAD/GIS program 108 determines that the area is a closed polygon, and updates the pointers or other programming intricacies to group the lines 220, 222, 224, radius 226, line 228, and radius 230 to define parcel 202, rather than waiting until a batch processing request (e.g., a save request) is made. This grouping then appears as a parcel 202, which is saved within the CAD/GIS program 108 and can be viewed by a user as parcel 202 rather than some other icon or visual entity on display 102. Further, parcel 206 may also be automatically placed in a hierarchy 300 without waiting for a batch processing request.

Hierarchy Relationships and Requirements

Parcels are collected in the CAD/GIS program 108 in a hierarchical relationship upon creation within the present invention. Parcels 202-214 typically comprise boundary segments, area, area labels, segment labels, and a buildable area definition that help define the parcel 202-214. Each parcel collection requires a root face 304, which has a specific icon in the hierarchy 300 to indicate the status of root face. Each site map 200 can have only one collection of parcels.

Further, the collection of parcels can have only one root face/parcel 304, which must encompass all of the other parcels 202-214 within the system. The root face 304 will always be automatically placed at the top of the hierarchy 300 by the CAD/GIS program 108, and the root face/parcel level of the hierarchy 300 can contain only one face/parcel, which is the root face/parcel 304.

Root faces 304 can have an unlimited number of child faces/parcels 202-214 at different hierarchy levels. Child faces/parcels 202-214 cannot exist at the same level as the root face/parcel 304. Further, one child face/parcel 202-214 cannot overlap any other child face/parcel 202-214, but a child face/parcel 202-214 can exist as an "island" completely surrounded by another child face/parcel 202-214. A child face/parcel 202-214 that wholly contains another child face/parcel can be represented by a different icon within hierarchy 300 to indicate to the user that there is a special relationship existing for that child face/parcel 202-214.

Right-of-ways 216 are special child faces/parcels, typically represented by a different icon within the hierarchy 300. Child faces/parcels 202-214 cannot exist within a face/right-of-way 216. Special definitions can be used with child faces/parcels 202-214 that front right-of-way faces 216.

Figure 4:
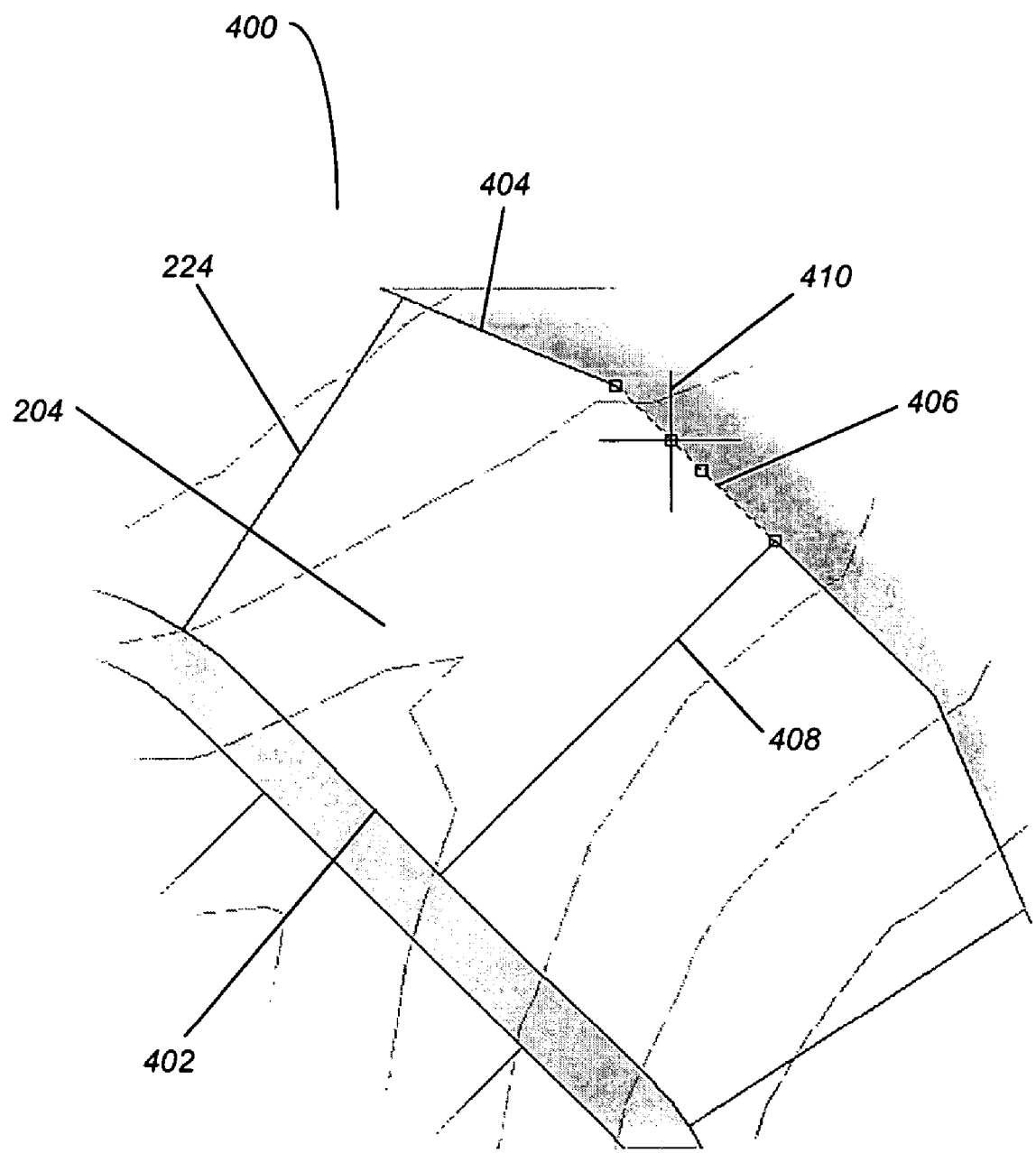
FIG. 4 illustrates a boundary selected for deletion within the present invention.

FIG. 4 illustrates a line segment selected for deletion within the present invention.

Portion 400 of site map 200 shows face/parcel 204, with lines 224 and 402-408 defining parcel 204. Line 406 is selected by the user, which is shown by cursor 410 being placed on line 406, as well as line 406 being shown as a dashed line. The user can delete line 406 through any one of several standard or customized techniques which are present in the CAD/GIS program 108, e.g., using a text command at a command line, selecting a delete command from a graphical user interface menu, selecting the delete key on a keyboard, etc.

Figure 5:
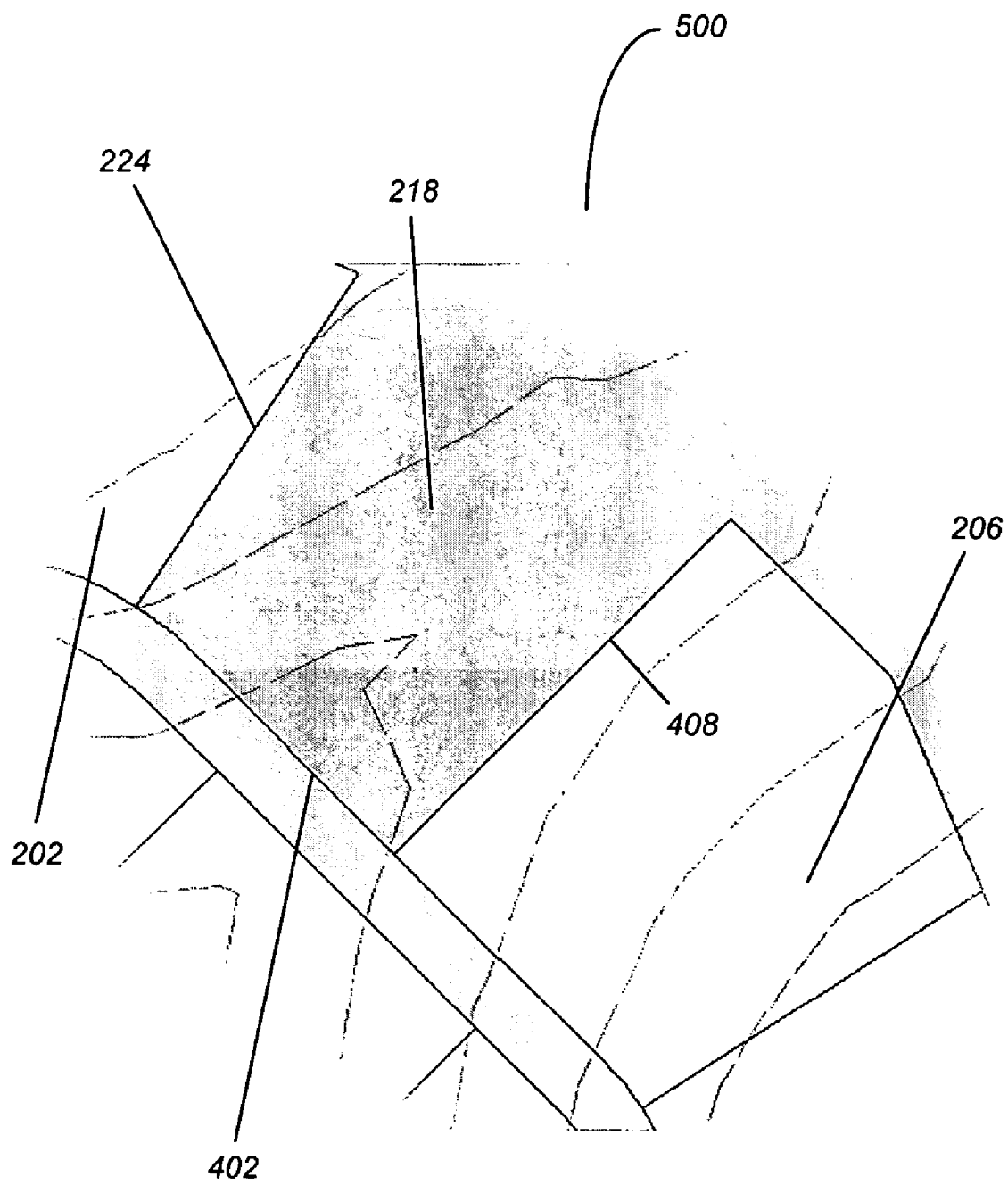
FIG. 5 illustrates the site map after the deletion of the selected boundary within the present invention.

FIG. 5 illustrates the site map after the deletion of the selected boundary within the present invention.

The parcel 204, once line 406 is deleted, is no longer a closed polygon. The CAD/GIS program 108 of the present invention realizes this and automatically deletes line 404 from the memory of the system. To reflect such deletion, hierarchy 300 may also be updated accordingly. The CAD/GIS program 108 of the present invention also realizes that boundary lines 224, 408, and 402 cannot be deleted, because they are used to define other parcels or regions within site map 500. For example, and not by way of limitation, line 224 is used to define not only former parcel 204, it also defines parcel 202.

The CAD/GIS program 108 of the present invention, when implemented in an object-oriented programming environment, can use pointers to determine which boundaries to delete. For example, and not by way of limitation, line 224 would have a pointer that points to face/parcel 202 and face/parcel 204. Although the pointer to face/parcel 204 would be deleted, line 224 cannot be deleted completely, because there is still a pointer to face/parcel 202, which still exists at the time of deletion of line 406. As such, line 224 would not be deleted at this time. Alternatively, each line may have a list of faces/parcels it is associated with that is updated when necessary. Other methods can be used depending on the programming environment or programming structure within a given programming environment.

Once parcel 204 is deleted, the area underneath former parcel 204 reverts to a different parcel within the hierarchy. In this case, the area reverts to wetlands 218, since the area under former parcel 204 is no longer separated from wetlands 218 by the line that was deleted. However, the area may revert to other parcels, or, depending on the community standards or other rules programmed into the CAD/GIS program 108, the reversion of the area underneath former parcel 204 may change the size of other parcels 202 or force other events to occur. For example, and not by way of limitation, there may be a local ordinance that requires there to be at least two lots having at least a 50 foot frontage on any wetland area. Once parcel 204 is deleted, there will only be one lot having such a frontage, namely, parcel 204. The CAD/GIS program 108 of the present invention may inform the user of this occurrence, prevent the user from deleting parcel 204, or take some other action, depending on the programming used within the CAD/GIS program 108.

The present invention, rather than updating all of the faces/parcels in the site map 200, only updates the faces/parcels affected by the change So, when line 406 is deleted, the deletion changes only those boundaries that are associated with parcel 204 and wetland 218, but not anything to do with other faces/parcels (e.g., parcel 210) that have not changed because of the deletion of line 406. For example, and not by way of limitation, when line 406 is deleted, line 224 would have to be updated, because it is no longer part of parcel 204, but it would not be deleted because line 224 remains part of parcel 202. However, since there are no changes to any boundary associated with parcel 210, the CAD/GIS program 108 of the present invention would recognize that there are no associations, and not update the boundaries associated with parcel 210.

Similarly, when a line is created, the CAD/GIS program 108 only updates those parcels or faces affected by the added line, rather than updating all of the faces, parcels, and geometry that are present in the site map 200.

Flowchart

Figure 6:
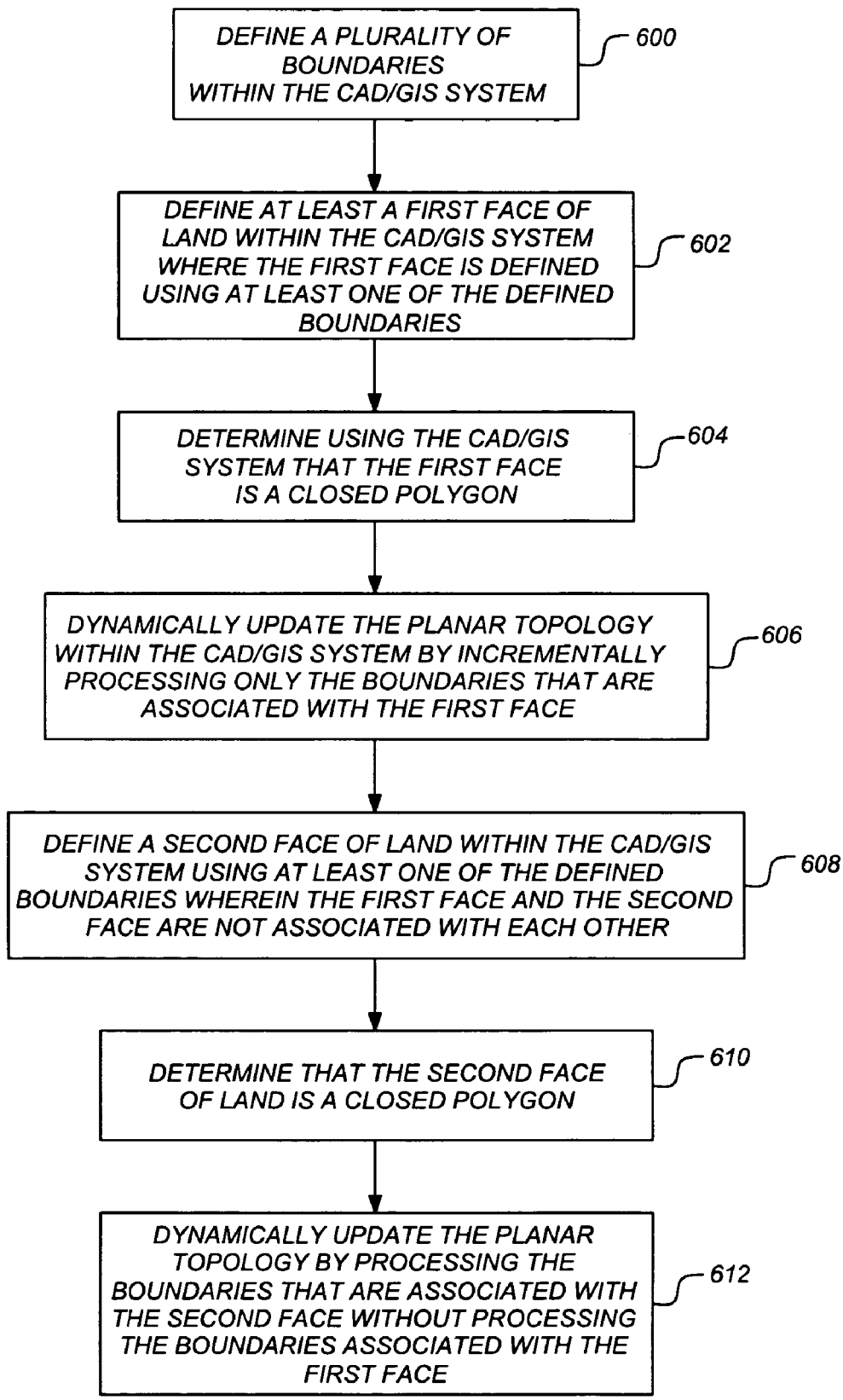
FIG. 6 is a flowchart illustrating the steps of the present invention.

FIG. 6 is a flowchart illustrating the steps of the present invention.

Box 600 illustrates performing the step of defining a plurality of boundaries within the CAD/GIS system.

Box 602 illustrates performing the step of defining at least a first face/parcel of land within the CAD/GIS system, where the first face/parcel is defined using at least one of the defined boundaries.

Box 604 illustrates performing the step of determining, using the CAD/GIS system, that the first face/parcel is a closed polygon.

Box 606 illustrates performing the step of dynamically updating the planar topology within the CAD/GIS system by incrementally processing only the boundaries that are associated with the first face/parcel.

Box 608 illustrates performing the step of defining a second face/parcel of land within the CAD/GIS system using at least one of the defined boundaries, wherein the first face/parcel and the second face/parcel are not associated with each other.

Box 610 illustrates performing the step of determining, using the CAD/GIS system, that the second face/parcel of land is a closed polygon.

Box 612 illustrates performing the step of dynamically updating the planar topology within the CAD/GIS system by processing the boundaries that are associated with the second face/parcel without processing the boundaries associated with the first face/parcel.

Additional steps that may be performed within the updating boxes are defining a second face/parcel of land within the CAD/GIS system using at least one of the defined boundaries, wherein the first face/parcel and the second face/parcel are associated with each other by at least a common boundary, determining, using the CAD/GIS system, that the second face/parcel of land is a closed polygon, dynamically updating the planar topology within the CAD/GIS system by processing the boundaries that are associated with the second face/parcel and the common boundaries without processing the boundaries associated with the first face/parcel that are not associated with the second face/parcel, deleting at least one boundary used to define the first face/parcel within the planar topology of the CAD/GIS system such that the first face/parcel is no longer a closed polygon, dynamically updating the planar topology within the CAD/GIS system by processing the boundaries associated with the first face/parcel without processing the boundaries associated with the second face/parcel, and deleting additional boundaries that are associated with the first face/parcel that are not associated with the second face/parcel.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide methods, apparatuses, and articles of manufacture for dynamically updating a planar topology in a computer assisted design and geographic information (CAD/GIS) system. A method in accordance with the present invention comprises defining a plurality of boundaries within the CAD/GIS system, defining at least a first face/parcel of land within the CAD/GIS system, where the first face/parcel is defined using at least one of the defined boundaries, determining, using the CAD/GIS system, that the first face/parcel is a closed polygon, and dynamically updating the planar topology within the CAD/GIS system by incrementally processing only the boundaries that are associated with the first face/parcel.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A method for dynamically updating a planar topology in a computer assisted design and geographic information (CAD/GIS) system, comprising:
    defining a plurality of boundaries within the CAD/GIS system;
    defining at least a first face of land within the CAD/GIS system, where the first face is defined using at least one of the defined boundaries;
    determining, as one of the defined boundaries is drawn thereby completing the first face, using the CAD/GIS system, that the first face is a closed polygon; and
    in response to the determining, dynamically updating the planar topology within the CAD/GIS system by incrementally processing only the boundaries that are associated with the first face.

2. The method of claim 1, further comprising:
    defining a second face of land within the CAD/GIS system using at least one of the defined boundaries, wherein the first face and the second face are not associated with each other;
    determining, using the CAD/GIS system, that the second face of land is a closed polygon; and
    dynamically updating the planar topology within the CAD/GIS system by processing the boundaries that are associated with the second face without processing the boundaries associated with the first face.

3. The method of claim 1, further comprising:
    defining a second face of land within the CAD/GIS system using at least one of the defined boundaries, wherein the first face and the second face are associated with each other by at least a common boundary;
    determining, using the CAD/GIS system, that the second face of land is a closed polygon; and
    dynamically updating the planar topology within the CAD/GIS system by processing the boundaries that are associated with the second face and the common boundaries without processing the boundaries associated with the first face that are not associated with the second face.

4. The method of claim 3, further comprising
    deleting at least one boundary used to define the first face within the planar topology of the CAD/GIS system such that the first face is no longer a closed polygon; and
    dynamically updating the planar topology within the CAD/GIS system by processing the boundaries associated with the first face without processing the boundaries associated with the second face.

5. The method of claim 4, wherein the updating of the planar topology within the CAD/GIS system further comprises deleting additional boundaries that are associated with the first face that are not associated with the second face.

6. The method of claim 1, wherein the first face is defined as a lot, a right-of-way, a wetland, an easement, or an open space.

7. An apparatus for dynamically updating a planar topology in a computer assisted design and geographic information (CAD/GIS) system, comprising:
    (a) a computer system having a memory and a data storage device coupled thereto;
    (b) one or more CAD/GIS programs, performed by the computer, for
        (i) defining a plurality of boundaries within the CAD/GIS system;
        (ii) defining at least a first face of land within the CAD/GIS system, where the first face is defined using at least one of the defined boundaries;
        (iii) determining, as one of the defined boundaries is drawn thereby completing the first face, using the CAD/GIS system, that the first face is a closed polygon; and
        (iv) in response to the determining, dynamically updating the planar topology within the CAD/GIS system by incrementally processing only the boundaries that are associated with the first face.

8. The apparatus of claim 7, wherein the one or more CAD/GIS programs performed are further configured to:
    define a second face of land within the CAD/GIS system using at least one of the defined boundaries, wherein the first face and the second face are not associated with each other;
    determine, using the CAD/GIS system, that the second face of land is a closed polygon; and dynamically update the planar topology within the CAD/GIS system by processing the boundaries that are associated with the second face without processing the boundaries associated with the first face.

9. The apparatus of claim 7, wherein the one or more CAD/GIS programs are further configured to:
define a second face of land within the CAD/GIS system using at least one of the defined boundaries, wherein the first face and the second face are associated with each other by at least a common boundary;
determine, using the CAD/GIS system, that the second face of land is a closed polygon; and
dynamically update the planar topology within the CAD/GIS system by processing the boundaries that are associated with the second face and the common boundaries without processing the boundaries associated with the first face that are not associated with the second face.

10. The apparatus of claim 9 wherein the one or more CAD/GIS programs are further configured to:
delete at least one boundary used to define the first face within the planar topology of the CAD/GIS system such that the first face is no longer a closed polygon; and
dynamically update the planar topology within the CAD/GIS system by processing the boundaries associated with the first face without processing the boundaries associated with the second face.

11. The apparatus of claim 10 wherein the updating of the planar topology within the CAD/GIS system further comprises deleting additional boundaries that are associated with the first face that are not associated with the second face.

12. The apparatus of claim 7 wherein the first face is defined as a lot, a right-of-way, a wetland, an easement, or an open space.

13. An article of manufacture comprising a program storage device readable by a computer and embodying one or more instructions executable by the computer to perform a method for dynamically updating a planar topology in a computer assisted design and geographic information (CAD/GIS) system, the method comprising:
defining a plurality of boundaries within the CAD/GIS system;
defining at least a first face of land within the CAD/GIS system, where the first face is defined using at least one of the defined boundaries;
determining, as one of the defined boundaries is drawn thereby completing the first face, using the CAD/GIS system, that the first face is a closed polygon; and
in response to the determining, dynamically updating the planar topology within the CAD/GIS system by incrementally processing only the boundaries that are associated with the first face.

14. The article of manufacture of claim 13, further comprising:
defining a second face of land within the CAD/GIS system using at least one of the defined boundaries, wherein the first face and the second face are not associated with each other;
determining, using the CAD/GIS system, that the second face of land is a closed polygon; and
dynamically updating the planar topology within the CAD/GIS system by processing the boundaries that are associated with the second face without processing the boundaries associated with the first face.

15. The article of manufacture of claim 13, further comprising:
defining a second face of land within the CAD/GIS system using at least one of the defined boundaries, wherein the first face and the second face are associated with each other by at least a common boundary;
determining, using the CAD/GIS system, that the second face of land is a closed polygon; and
dynamically updating the planar topology within the CAD/GIS system by processing the boundaries that are associated with the second face and the common boundaries without processing the boundaries associated with the first face that are not associated with the second face.

16. The article of manufacture of claim 15, further comprising:
deleting at least one boundary used to define the first face within the planar topology of the CAD/GIS system such that the first face is no longer a closed polygon; and
dynamically updating the planar topology within the CAD/GIS system by processing the boundaries associated with the first face without processing the boundaries associated with the second face.

17. The article of manufacture of claim 16, wherein the updating of the planar topology within the CAD/GIS system further comprises deleting additional boundaries that are associated with the first face that are not associated with the second face.

18. The article of manufacture of claim 16, wherein the first face is defined as a lot, a right-of-way, a wetland, an easement, or an open space.

* * * * *